(12) United States Patent
Hu et al.

(10) Patent No.: US 10,748,351 B1
(45) Date of Patent: Aug. 18, 2020

(54) SHAPE REFINEMENT OF THREE DIMENSIONAL SHAPE MODEL

(71) Applicant: SONY CORPORATION, Tokyo (JP)

(72) Inventors: Jie Hu, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/531,332

(22) Filed: Aug. 5, 2019

(51) Int. Cl.
*G06T 19/20* (2011.01)
*G06T 15/04* (2011.01)
*G06T 15/50* (2011.01)
*G06T 7/593* (2017.01)

(52) U.S. Cl.
CPC .............. *G06T 19/20* (2013.01); *G06T 7/596* (2017.01); *G06T 15/04* (2013.01); *G06T 15/506* (2013.01); *G06T 2207/10024* (2013.01); *G06T 2207/30201* (2013.01)

(58) Field of Classification Search
CPC ....... G06T 19/20; G06T 15/506; G06T 7/596; G06T 15/04; G06T 2207/30201; G06T 2207/10024
See application file for complete search history.

(56) References Cited

U.S. PATENT DOCUMENTS 6,760,488 B1 * 7/2004 Moura ................... G06T 7/579
345/419

2010/0191391 A1 * 7/2010 Zeng ...................... G08G 1/165
701/1
2013/0250050 A1 9/2013 Kanaujia et al.
2015/0375445 A1 * 12/2015 Grundhofer ............ B29C 51/46
700/98

FOREIGN PATENT DOCUMENTS

CN 106485675 A 3/2017

OTHER PUBLICATIONS

Kemelmacher-Shlizerman, et al., "3D Face Reconstruction from a Single Image using a Single Reference Face Shape", IEEE Transactions on Pattern Analysis and Machine Intelligence, vol. 33, No. 2, Mar. 18, 2010, pp. 1-14. (Year: 2010).*

(Continued)

*Primary Examiner* — Robert J Craddock
(74) *Attorney, Agent, or Firm* — Chip Law Group

(57) ABSTRACT

An electronic apparatus for shape refinement of a three-dimensional (3D) shape model is provided. The electronic apparatus generates a back-projected image for an object portion based on an initial 3D shape model of the object portion and a texture map of the object portion. The electronic apparatus computes an optical flow map between the back-projected image and a two-dimensional (2D) color image of the object portion. The electronic apparatus determines a plurality of 3D correspondence points for a corresponding plurality of vertices of the initial 3D shape model, based on the optical flow map and a depth image of the object portion. The electronic apparatus estimates a final 3D shape model that corresponds to a shape-refined 3D model of the object portion based on the initial 3D shape model and the plurality of 3D correspondence points for the corresponding plurality of vertices of the initial 3D shape model.

20 Claims, 7 Drawing Sheets

(56) References Cited

OTHER PUBLICATIONS

Mustafa, et al., "Temporally Coherent 4D Reconstruction of Complex Dynamic Scenes", 2016 IEEE Conference on Computer Vision and Pattern Recognition (CVPR), Jun. 27-30, 2016, pp. 1-10.

Kemelmacher-Shlizerman, et al., "3D Face Reconstruction from a Single Image using a Single Reference Face Shape", IEEE Transactions on Pattern Analysis and Machine Intelligence, vol. 33, No. 2, Mar. 18, 2010, pp. 1-14.

* cited by examiner

SHAPE REFINEMENT OF THREE DIMENSIONAL SHAPE MODEL

CROSS-REFERENCE TO RELATED APPLICATIONS/INCORPORATION BY REFERENCE

None.

FIELD

Various embodiments of the disclosure relate to three-dimensional (3D) modeling technology, virtual human technology, and Virtual Reality (VR) technology. More specifically, various embodiments of the disclosure relate to an electronic apparatus and a method for shape refinement of a 3D shape model.

BACKGROUND

Advancements in the field of three-dimensional (3D) computer graphics and 3D modeling have paved way for development and visualization of realistic 3D models of different types of objects, e.g., human face in a 3D environment, such as a computer-generated imagery (CGI) environment. Typically, a 3D model of an object of interest may be rendered from a 3D mesh that uses polygonal surfaces to define a shape and geometry of the object of interest. In order to generate a realistic 3D model of the object of interest, the shape of the 3D model may need to be refined to match the actual shape of the object of interest.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and a method for shape refinement of a three-dimensional (3D) shape model, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus and method for shape refinement of a three-dimensional (3D) shape model. Exemplary aspects of the disclosure provide an electronic apparatus for shape refinement of the 3D shape model. The disclosed electronic apparatus may be configured to generate a back-projected image of an object portion (e.g., a human face or a frontal face portion) based on an initial 3D shape model of the object portion and a texture map of the object portion. The initial 3D shape model may be a shape un-refined 3D model of the object portion. The back-projected image may be generated based on projection of the initial 3D shape model with an applied texture from the texture map onto a two-dimensional (2D) image plane. The disclosed electronic apparatus may be further configured to compute an optical flow map between the back-projected image and a 2D color image of the object portion. The 2D color image of the object portion may be a high-definition (HD) color image and may represent actual color information of the object portion.

The disclosed electronic apparatus may utilize the computed optical flow map to determine a plurality of 3D correspondence points for a plurality of vertices of the initial 3D shape model. The determined plurality of 3D correspondence points may represent an actual shape of the object portion and may be further used to refine the initial 3D shape model of the object portion.

The disclosed electronic apparatus implements an optical flow-based approach to refine the shape of the initial 3D shape model. The shape refinement may be conducted by optimizing each vertex of the initial 3D shape model to the 3D correspondence point determined based on the optical flow map between the back-projected image and the 2D color image. The optical flow-based approach in the 3D shape modeling process may improve accuracy of depicting shape features in the refined 3D shape model(s) as compared to conventional refinement approaches in conventional 3D modelling schemes. Specifically, the optical flow-based approach may be effective for refinement of the initial 3D shape model and depiction of actual shape features of the object portion in the refined 3D shape model. Utilization of such refined 3D shape model may improve visual quality of 3D shape models implemented in various 3D model environments, for example, a virtual reality environment.

Figure 1:
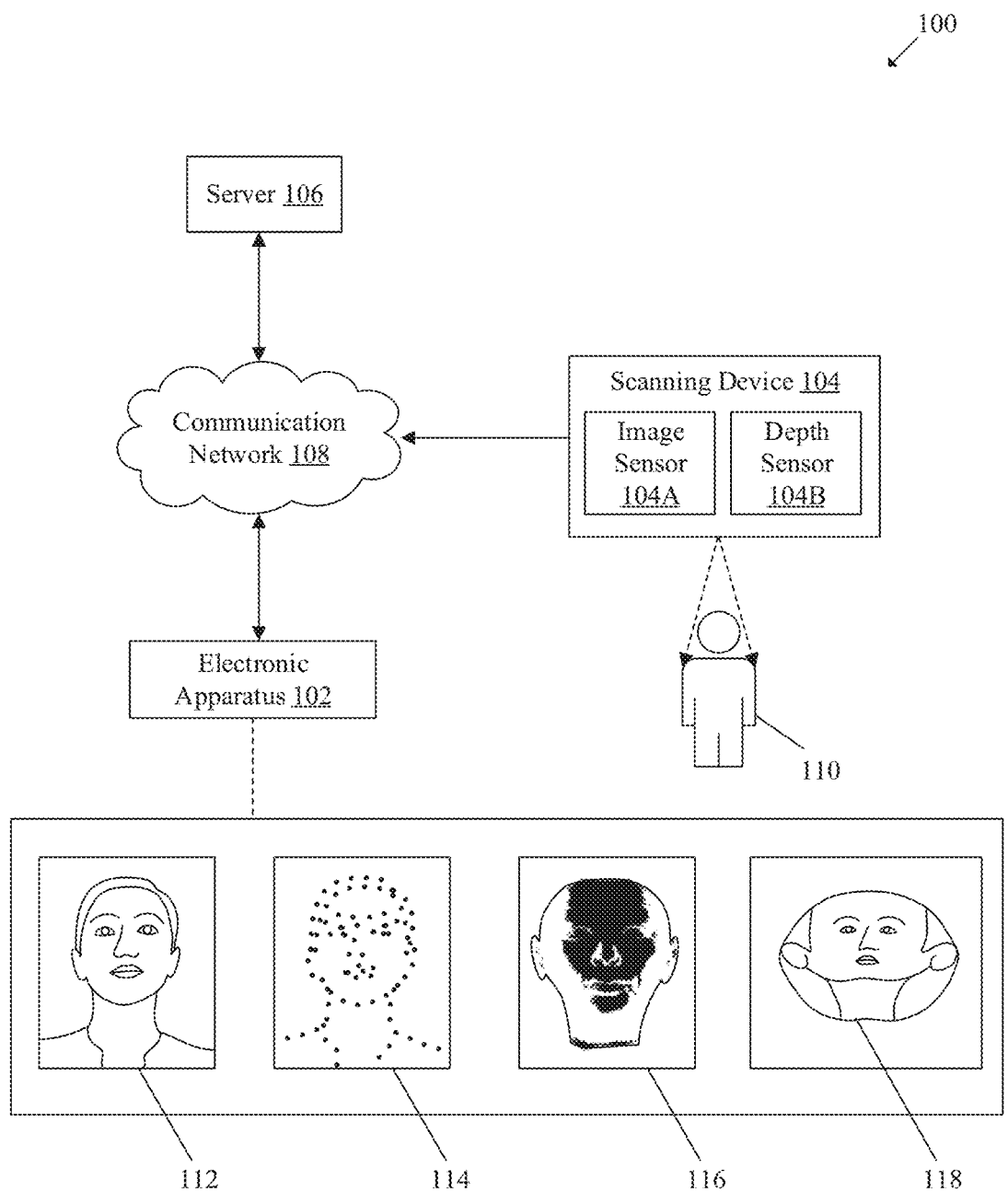
FIG. 1 is a block diagram that illustrates an exemplary network environment for shape refinement of a three-dimensional (3D) shape model, in accordance with an embodiment of the disclosure.

FIG. 1 is a block diagram that illustrates an exemplary network environment for shape refinement of a 3D shape model, in accordance with an embodiment of the disclosure. With reference to FIG. 1, there is shown a network environment 100. The network environment 100 may include an electronic apparatus 102, a scanning device 104, and a server 106. The scanning device 104 may further include an image sensor 104A and a depth sensor 104B. The electronic apparatus 102, the scanning device 104, and the server 106 may be communicatively coupled to each other, via a communication network 108.

There is further shown a user 110 who may be associated with the scanning device 104 and/or the electronic apparatus 102. The electronic apparatus 102 may be configured to store a color image of the object portion of an object-of-interest. The object-of-interest may be an animate object or an inanimate object, for example, human, animal, trees, and the like. The electronic apparatus 102 may be further configured to store a depth image corresponding to the color image, an initial 3D shape model of the object portion, and a texture map of the object portion. As an example, there is shown a color image 112, a depth image 114, an initial 3D shape model 116, and a texture map 118 of a face portion of the user 110.

The electronic apparatus 102 may comprise suitable logic, circuitry, and interfaces that may be configured to execute a set of operations associated with shape refinement of an initial 3D shape model of an object portion, for example, a face portion of the user 110. The set of operations may include, but are not limited to, generation of a back-projected image for the object portion, computation of an optical flow map between the generated back-projected image and the color image of the object portion, determination of a plurality of 3D correspondence points for a corresponding plurality of vertices of the initial 3D shape model, and estimation of a final 3D shape model. Examples of the electronic apparatus 102 may include, but are not limited to, a computing device, smartphone, a video-conferencing system, an augmented reality-based device, a gaming device, an RGB-Depth (RGBD) imaging device, capture device, a mainframe machine, a server, a computer work-station, and/or a consumer electronic (CE) device.

The scanning device 104 may comprise suitable logic, circuitry, and interfaces that may be configured to 3D scan an object portion, such as the face portion of the user 110. The scanning device 104 may be further configured to capture a plurality of color images and corresponding depth information of the object portion from one or more viewing angles and transmit the captured plurality of color images and corresponding depth information to the electronic apparatus 102 and/or the server 106, via the communication network 108. The scanning device 104 may include a plurality of sensors, such as a combination of an image sensor (such as the image sensor 104A), a depth sensor (such as the depth sensor 104B), a color sensor (such as a red-green-blue (RGB/RGBD) sensor), and/or an infrared (IR) sensor. Examples of the scanning device 104 may include, but are not limited to, the depth sensor, the RGB sensor, the IR sensor, a 3D-mesh structure generator, an image sensor, or a motion-detector device.

Additionally or alternatively, in one or more embodiments, the scanning device 104 may include an active 3D scanner that relies on radiations or light to capture a 3D structure of the object portion in a 3D space. For example, the active 3D scanner may be a time-of-flight (TOF)-based 3D laser scanner, a laser range-finder, a TOF camera, a hand-held laser scanner, a structured light 3D scanner, a modulated light 3D scanner, a CT scanner that outputs point cloud data, an aerial Light Detection And Ranging (LiDAR) laser scanner, a 3D LiDAR, a 3D motion sensor, and the like.

Although in FIG. 1, the scanning device 104 is shown as a separate device from the electronic apparatus 102. However, the disclosure may not be so limited and in some embodiments, the entire functionality of the scanning device 104 may be integrated within the electronic apparatus 102, without a deviation from the scope of the present disclosure.

The server 106 may comprise suitable logic, circuitry, and interfaces that may be configured to store the plurality of color images and corresponding depth information captured by the scanning device 104. Also, in certain instances, the server 106 may be configured to store the color image of the object portion, the depth image of the object portion, the initial 3D shape model of the object portion, and the texture map for the object portion. Examples of the server 106 may include, but are not limited to, a database server, a file server, a web server, a gaming server, a media server, a cloud server, an application server, a mainframe server, or other types of servers.

The communication network 108 may include a communication medium through which the electronic apparatus 102, the scanning device 104, and the server 106 may communicate with each other. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the scanning device 104 may be configured to scan the object portion corresponding to an object-of-interest from one or more viewing angles. The object-of-interest may be positioned in front of the scanning device 104. As an example, the image sensor 104A of the scanning device 104 may be configured to capture a plurality of color images of the object portion from the one or more viewing angles and the depth sensor 104B may be configured to capture depth information corresponding to the plurality of color images of the object portion. The captured depth information of the object portion may include information about "Z" coordinates of points on the object portion in a 3D space.

In certain instances, the object-of-interest may be the user 110 and the object portion may be the face portion of the user 110. The scanning device 104 may be configured to scan the face portion of the user 110 from one or more viewing angles while the user 110 is positioned in front of the scanning device 104. The scanning device 104 may be further configured to capture a plurality of color images and depth information corresponding to the plurality of color images of the face portion of the user 110. Different regions of the face portion having wrinkles may have different depth values as compared to other regions without wrinkles. These different regions having wrinkles may be prominent regions and may require accurate shape refinement while 3D modelling.

The plurality of color images and the corresponding depth information may be synchronized with each other such that the plurality of color images and the corresponding depth information may be captured together at a same time and may represent a common field-of-view. The synchronization of the plurality of color images and the corresponding depth information may provide an enhanced understanding of the shape features (e.g., cuts, depression, curvature, etc.) and depth of each region of shape portion from a 3D perspective.

The scanning device 104 may be further configured to transmit the plurality of color images and the corresponding depth information to the electronic apparatus 102 and the server 106, via the communication network 108. In some embodiments, the scanning device 104 may be a part of the electronic apparatus 102. In such cases, the plurality of color images and the corresponding depth information may be directly stored at the electronic apparatus 102.

The electronic apparatus 102 may be further configured to store the color image of the plurality of color images and the depth image corresponding to the color image. The color image may be a high-resolution image that may depict an actual texture of the object portion and may be a frontal view of the object portion. The electronic apparatus 102 may be further configured to store the initial 3D shape model of the object portion. The initial 3D shape model may be a mathematical representation of the object portion in the 3D space and in certain instances, the initial 3D shape model may be referred to as a shape unrefined 3D model of the object portion. The shape of some portions of the initial 3D shape model may be inaccurate and may not represent an actual shape of the object portion. Additionally, intricate details of features of the object portion may be absent in the initial 3D shape model of the object portion. As an example, intricate details of features of the face portion, such as moles, wrinkles, lines, furrows, or other features of the face, may be absent in the initial 3D shape model.

In one or more embodiments, the initial 3D shape model may be stored as a pre-generated shape model on a server, such as the server 106 and the electronic apparatus 102 may be configured to retrieve the initial 3D shape model from the server 106. In certain other embodiments, the electronic apparatus 102 may be configured to generate the initial 3D shape model 116 based on the captured plurality of color images and the corresponding depth information of the object portion.

Exemplary operations of the electronic apparatus 102 for generation of the initial 3D shape model for the object portion are described herein. In order to generate the initial 3D shape model, the electronic apparatus 102 may be configured to store a 3D model that may be generated based on Principal Component Analysis (PCA) on a plurality of object portions of test objects of same object type. The stored 3D model may represent the object portion as a linear combination of different basic shape components. As an example, for the face portion, the stored 3D model may be generated based on PCA of a plurality of face portions, such as "100"-"300" faces of reference users.

The shape of the stored 3D model may be a mean-shape of the plurality of object portions. The electronic apparatus 102 may be configured to generate a point cloud corresponding to the object portion based on the plurality of color images and the corresponding depth information. The point cloud may be generated to represent a surface of the object portion including a plurality of feature points, for example, for the face portion, feature points may be eyes, nose, and lips, and the like.

The electronic apparatus 102 may be further configured to align the generated point cloud with the stored 3D model. The electronic apparatus 102 may be further configured to apply a rigid alignment operation on a plurality of feature points of the object portion and a non-rigid alignment operation on all the remaining feature points of the object portion. In the rigid alignment operation, the electronic apparatus 102 may be configured to align the plurality of feature points, for example, eyes, nose, lips, and/or other feature points of the face portion, with the stored 3D model to generate a rigid aligned point cloud. In the non-rigid alignment operation, all the remaining feature points may be aligned with the stored 3D model.

The electronic apparatus 102 may be further configured to generate a deformed mean-shape model, for example, a deformed mean-shape face model in a neutral expression. The deformed mean-shape model may be generated based on application of the rigid alignment operation and non-rigid alignment operation on the stored 3D model. Once generated, the deformed mean-shape model may be used to find a correspondence between vertices on the mean shape and the point cloud. Thereafter, the correspondence may be used as a constraint to fit a linear model. As it is mentioned earlier that the stored 3D model represents the object portion as a linear combination of different basic shape components, the initial 3D model may also be the linear combination of the basic shape components.

The electronic apparatus 102 may be further configured to generate a back-projected image for the object portion. A texture map may be required to generate the back-projected image. The texture map may correspond to a 2D image that represents texture information of the object portion. For example, the texture map 118 may represent the facial texture, such as a color and appearance of the skin and facial features (e.g., eyes, nose, lips, ears, etc.) of the face portion of the user 110. In one or more embodiments, the texture map may be stored as pre-estimated texture information of the object portion. Alternatively, the electronic apparatus 102 may be configured to generate the texture map for the object portion.

Exemplary operations for the generation of the texture map are provided herein. The electronic apparatus 102 may be configured to generate an initial texture map for the object portion based on the initial 3D shape model of the object portion, the color image, and the depth image of the object portion. The initial 3D shape model may be an un-textured 3D model of the object portion. Initially, an initial texture map for the object portion may be generated by direct application and mapping of texture (or color information) from the color image of the object portion. However, generated initial texture map may include some regions for which texture information of certain occluded regions may be absent or unavailable in the color image. For example, for a frontal facial image as the color image, occluded regions may include area behind ears or side regions around the neck.

The electronic apparatus 102 may be further configured to store a reference texture model. The reference texture model may be a combination of a plurality of eigenvalues and a plurality of eigenvectors extracted by the application of Principal Component Analysis (PCA) on a plurality of texture maps of a corresponding plurality of reference object portion different from the object portion of the object of interest. Each of the plurality of reference object portions may be under a common ambient lighting condition so that a uniform texture map of each reference object portion is generated.

The electronic apparatus 102 may be further configured to generate a model-fitted texture map for the object portion by texture model fitting of the reference texture model on a plurality of effective points on the generated initial texture map. The plurality of effective points may correspond to points that belong to the object portion and are observed in the color image. Each effective point of the plurality of effective points may be a point on the initial texture map for which a corresponding triangle may be present on the initial 3D shape model. Alternatively stated, each effective point of the plurality of effective points may be a point on the initial texture map for which a corresponding point may be observed on the color image. The electronic apparatus 102 may be further configured to iteratively, estimate a lighting strength for each of an ambient light and a diffused light, a lighting direction, and a specular reflectance for the initial texture map. The lighting strength for each of an ambient light and a diffused light, the lighting direction, and the specular reflectance for the initial texture map may be estimated based on a reflectance model, the initial texture map, and the initial 3D shape model. The reflectance model may be an empirical model for illumination of points on a surface. An example of the reflectance model may be a Phong reflectance model. The reflectance model may illustrate a way a surface (e.g. the face of the user 110) may reflect light as a combination of ambient light, diffused light, and specular reflectance. The reflectance model may include a relationship between a lighting strength for each of the ambient light and the diffused light, a lighting direction, and a specular reflectance.

The electronic apparatus 102 may be further configured to estimate a set of albedo values for a plurality of points on the initial texture map based on the reference texture model, the estimated lighting strength for each of the ambient light and the diffused light, the lighting direction, and the specular reflectance. The estimated set of albedo values may be a set of reconstructed albedo values that may correspond to a real texture of the object portion. The set of albedo values may be reconstructed from the reference texture model and the initial texture map.

The electronic apparatus 102 may be further configured to generate the model-fitted texture map based on the determined set of albedo values. The generated model-fitted texture map may include the determined set of albedo values and may include a reconstructed texture for the plurality of occluded regions, such as area behind ears, areas around the nose, or side regions around the neck, for which texture may be absent or inaccurately represented in the initial texture map. For the generation of the back-projected image, the texture map may correspond to the generated model-fitted texture map which may accurately represent a complete texture of the object portion.

Exemplary operations for the generation of the back-projected image are provided herein. In one or more embodiments, electronic apparatus 102 may be configured to texture the initial 3D shape model based on the texture map of the object portion and project the textured initial 3D shape model onto a 2D image plane. The back-projected image may be generated based on the projection of the textured initial 3D shape model onto the 2D image plane.

In one or more other embodiments, the electronic apparatus 102 may be configured determine a first plurality of triangles on the texture map and a second plurality of triangles on the initial 3D shape model. The electronic apparatus 102 may be further configured to map each triangle of the first plurality of triangles on the texture map to a corresponding triangle of the second plurality of triangles on the initial 3D shape model. The electronic apparatus 102 may be configured to generate the back-projected image for the object portion based on the projection (i.e. perspective projection) of the second plurality of triangles on a 2D image plane. The second plurality of triangles may be textured based on the texture map of the object portion.

The back-projected image may be generated such that a lighting influence on the object portion is included in each point of the back-projected image. As the texture map stores albedo values on the object portion without a lighting influence, each point of the generated back-projected image may only show an albedo value without an influence of the lighting conditions instead of capturing the real lighting on the object portion. Such a lighting influence may be an influence on the surface of the object portion due to some external light sources (e.g., natural light sources, artificial light sources, etc.) when the color image is captured. Operations associated with the generation of the back-projected image are further described, for example, in FIG. 4.

The electronic apparatus 102 may be further configured to compute an optical flow map between the generated back-projected image and the color image of the object portion. The electronic apparatus 102 may be further configured to compute the optical flow map based on an offset between each point of a first plurality of points of the color image and a corresponding point of a second plurality of points of the generated back-projected image of the object portion. The optical flow map may be computed using a suitable optical flow estimation method, which may be known to one ordinarily skilled in the art. The computed optical flow map may indicate a difference between position of points in the back-projected image and position of corresponding points in the color image. The computation of the optical flow map is further described, for example, in FIG. 5.

The electronic apparatus 102 may be further configured to determine a plurality of 3D correspondence points for a corresponding plurality of vertices of the initial 3D shape model based on the computed optical flow map and the depth image of the object portion. The plurality of 3D correspondence points may be a plurality of points in the 3D space corresponding to the vertices of the initial 3D shape model. Also, the plurality of 3D correspondence points may represent an accurate shape of a plurality of features of the object portion. The determination of the plurality of 3D correspondence points is further described in detail, for example, in FIG. 6.

The electronic apparatus 102 may be further configured to estimate a final 3D shape model of the object portion based on the initial 3D shape model and the determined plurality of 3D correspondence points for the corresponding plurality of vertices of the initial 3D shape model. The final 3D shape model may correspond to a shape-refined 3D model of the object portion and may depict actual shape features of the object portion. In certain embodiments, the electronic apparatus 102 may be configured to offset positions of at least a first set of vertices of the corresponding plurality of vertices of the initial 3D shape model based on the determined plurality of 3D correspondence points. In other words, at least the first set of vertices of the initial 3D shape model may be displaced based on the determined plurality of 3D correspondence points. Thus, the final 3D shape model may be estimated based on the offset of at least the first set of vertices of the corresponding plurality of vertices of the initial 3D shape model. The estimation of the final 3D shape model is further described in detail, for example, in FIG. 6.

In an exemplary scenario, the electronic apparatus 102 may be further configured to control a display device to render the final 3D shape model. The final 3D shape model may realistically represent the surface features of the object portion, for example, the face portion of the user 110. The display device may be a Virtual Reality (VR) or Augmented Reality (AR) device which may render a VR/AR environment and the final 3D shape model in the rendered VR/AR environment. The final 3D shape model may be also used for other applications, including but not limited to, video games, Visual Effects (VFX), Computer-Generated Imagery (CGI), and a 3D model-based video conferencing.

Figure 2:
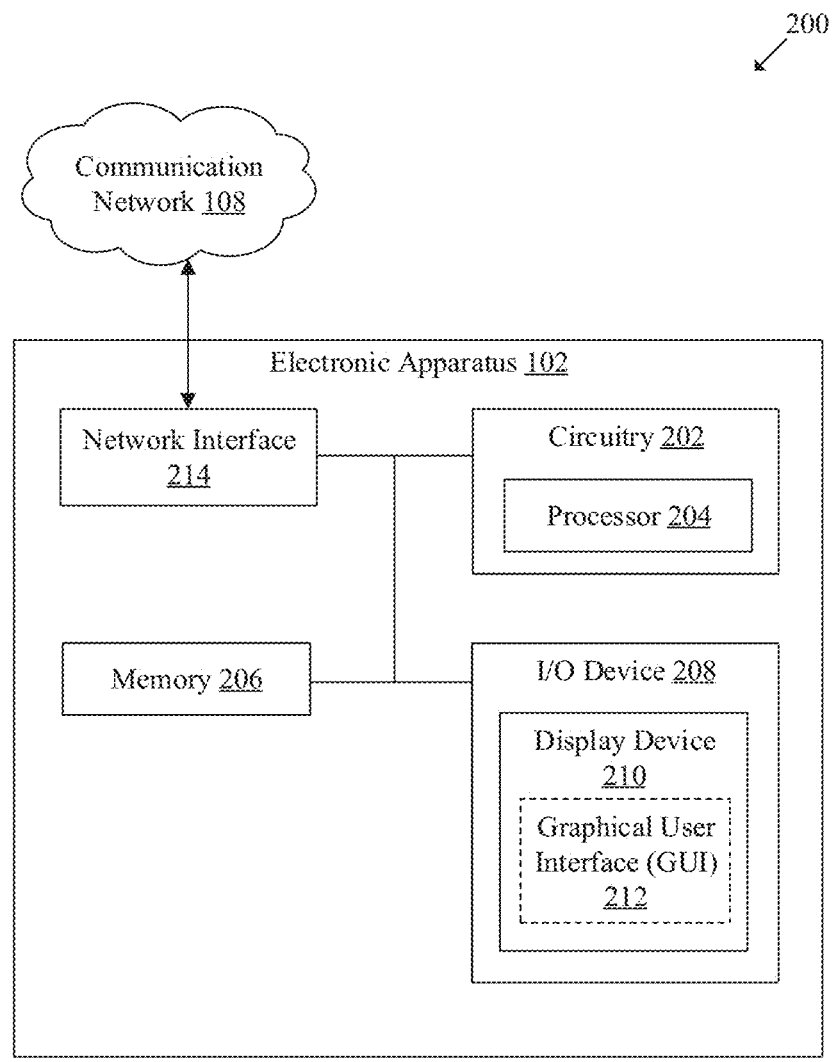
FIG. 2 is a block diagram that illustrates an exemplary electronic apparatus for shape refinement of a 3D shape model, in accordance with an embodiment of the disclosure.

FIG. 2 is a block diagram that illustrates an exemplary electronic apparatus for shape refinement of a 3D shape model, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202 which may include one or more processors, such as a processor 204. The electronic apparatus 102 may further include a memory 206 and an input/output (I/O) device 208. An example of the I/O device 208 may be a display device 210 which may render a Graphical User Interface (GUI) 212. The electronic apparatus 102 may further include a network interface 214. The circuitry 202 may be configured to communicate with the scanning device 104 and the server 106 by use of the network interface 214. Also, the circuitry 202 may be communicatively coupled to the memory 206, the I/O device 208, and the network interface 214.

The processor 204 may comprise suitable logic, circuitry, and interfaces that may be configured to execute instructions stored in the memory 206. Some of the instructions may correspond to operations for shape refinement of the initial 3D shape model for the object portion. The operations may include, but are not limited to, generation of a back-projected image for the object portion, computation of an optical flow map between the generated back-projected image and a color image of the object portion, determination of a plurality of 3D correspondence points for a corresponding plurality of vertices of the initial 3D shape model, and estimation of the final 3D shape model based on the initial 3D shape model and the determined plurality of 3D correspondence points. The processor 204 may be implemented based on a number of processor technologies, known to one ordinarily skilled in the art. Examples of the processor technologies may include, but are not limited to, a Central Processing Unit (CPU), x86/x64-based processor, a Reduced Instruction Set Computing (RISC) processor, an Application-Specific Integrated Circuit (ASIC) processor, a co-processor, a Complex Instruction Set Computing (CISC) processor, a Graphical Processing Unit (GPU), and other processors.

The memory 206 may comprise suitable logic, circuitry, and interfaces that may be configured to store the instructions to be executed by the circuitry 202 or the processor 204. The memory 206 may be further configured to store the color image and the depth image of the object portion. Also, in certain instances, the memory 206 may be further configured to store the initial 3D shape model and the texture map as pre-estimated data for the object portion. The memory 206 may be implemented as one of a persistent data storage, a non-persistent data storage, or a combination thereof. Some examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 208 may comprise suitable logic, circuitry, and interfaces that may be configured to receive a user input and provide an output based on the received user input. The I/O device 208 which may include various input and output devices, may be configured to communicate with the circuitry 202. Examples of the I/O device 208 may include, but are not limited to, a touch screen, a keyboard, a mouse, a joystick, a microphone, a display device (for example, the display device 210), and a speaker.

The display device 210 may comprise suitable logic, circuitry, and interfaces that may be configured to display the GUI 212 which may include one or more user-selectable options to control display settings/preferences and/or interactivity with a 3D shape model, for example, a final 3D shape model of the face portion of the user 110. In some embodiments, the display device 210 may be an external display device associated with the electronic apparatus 102. The display device 210 may be a touch screen which may enable the user 110 to provide a user-input via the display device 210. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display.

The GUI 212 may correspond to a user interface (UI) rendered on a display device, such as the display device 210. The GUI 212 may be configured to display the final 3D shape model of object portion. Additionally, the GUI 212 may be further configured to display graphical elements that may correspond to the one or more user-selectable options for a view selection, a display control, and other interactive control options.

The network interface 214 may comprise suitable logic, circuitry, and interfaces that may be configured to facilitate communication between the electronic apparatus 102, the scanning device 104, and the server 106, via the communication network 108. The network interface 214 may be implemented by use of various known technologies to support wired or wireless communication of the electronic apparatus 102 with the communication network 108. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 214 may be configured to communicate via wireless communication with networks, such as the Internet, an Intranet or a wireless network, such as a cellular telephone network, a wireless local area network (LAN), and a metropolitan area network (MAN).

The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The operations executed by the circuitry 202 are described in detail, for example, in FIGS. 3, 4, 5, and 6.

Figure 3:
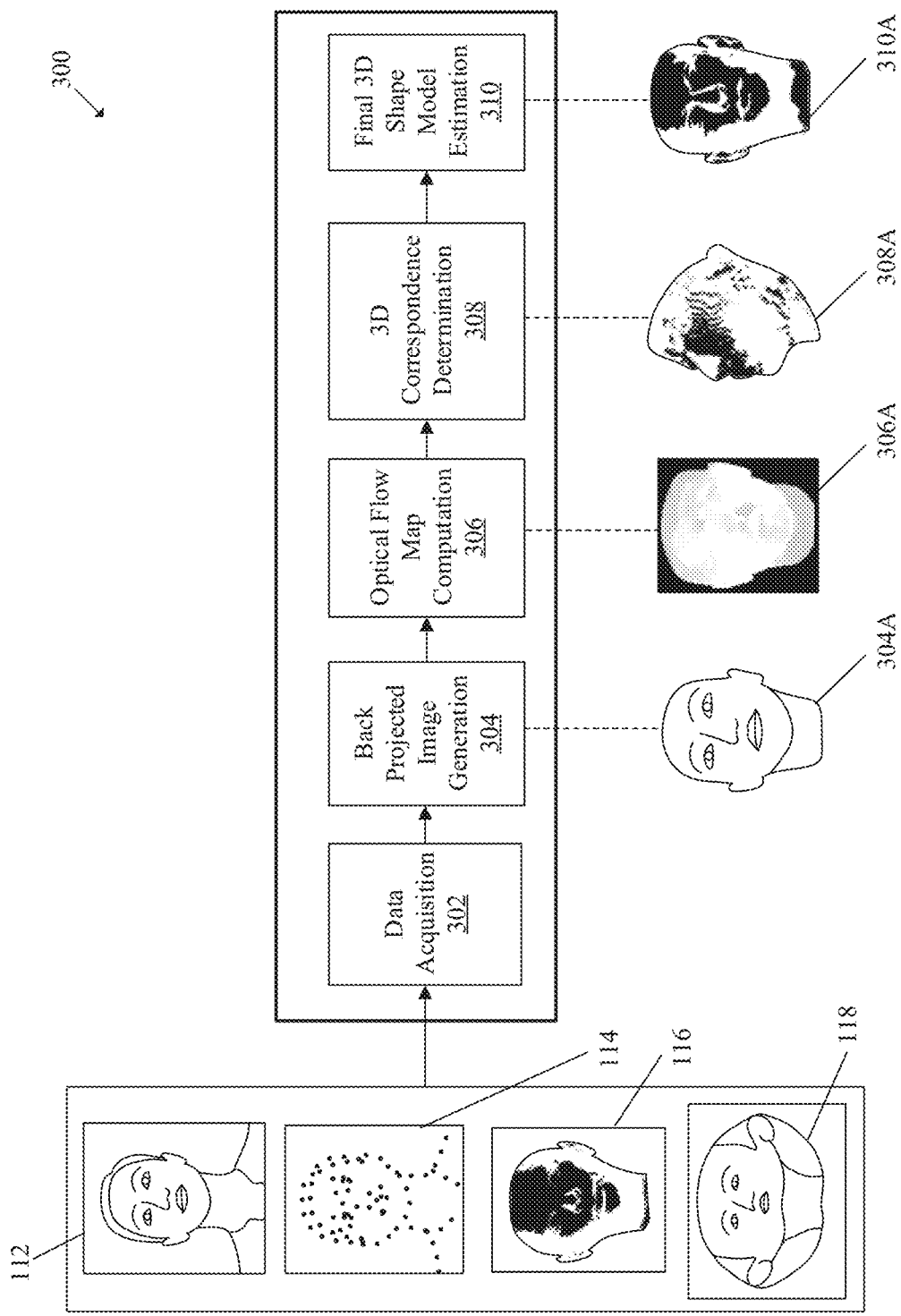
FIG. 3 illustrates exemplary operations for shape refinement of a 3D shape model, in accordance with an embodiment of the disclosure.

FIG. 3 illustrates exemplary operations for shape refinement of a 3D shape model, in accordance with an embodiment of the disclosure. FIG. 3 is described in conjunction with elements from FIG. 1 and FIG. 2. With reference to FIG. 3, there is shown a processing pipeline 300 that includes a set of operations for shape refinement of a 3D shape model.

At 302, a data acquisition operation may be executed. In the data acquisition operation, the processor 204 may be configured to retrieve the color image 112 of the face of the user 110 and the depth image 114 corresponding to the color image 112. The processor 204 may be further configured to retrieve the initial 3D shape model 116 of the face of the user 110 and the texture map 118 of the face of the user 110 from the memory 206.

In some embodiments, the color image 112, the depth image 114, the initial 3D shape model 116, and the texture map 118 may be stored on the server 106. In such cases, the processor 204 may be configured to retrieve the color image 112, the depth image 114, the initial 3D shape model 116, and the texture map 118 from the server 106, via the communication network 108. The depth image 114 may be synchronized with the color image 112 such that the color image 112 and the depth image 114 represent a common field-of-view.

At 304, a back-projected image generation operation may be executed. In the back-projected image generation operation, the processor 204 may be configured to generate a back-projected image 304A of the face of the user 110 based on the initial 3D shape model 116 and the texture map 118 of the face of the user 110. The processor 204 may be further configured to transform and map each triangle of a plurality of triangles on the texture map 118 to a corresponding triangle on a 2D image plane by using the initial 3D shape model 116. The processor 204 may be further configured to apply texture information from the texture map 118 on the initial 3D shape model 116 based on U-V coordinates of the texture map 118. The processor 204 may be further configured to back project (i.e. a perspective projection) the initial 3D shape model 116 with the applied texture information from the texture map 118, onto the 2D image plane. The generation of the back-projected image is further described in detail, for example, in FIG. 4.

At 306, an optical flow map computation operation may be executed. In the optical flow map computation operation, the processor 204 may be configured to compute an optical flow map 306A between the generated back-projected image 304A and the color image 112 of the face of the user 110. The processor 204 may be further configured to compute the optical flow map 306A based on an offset between each point of a first plurality of points of the color image 112 and a corresponding point of a second plurality of points of the generated back-projected image 304A of the face of the user 110. The computed optical flow map 306A may indicate a difference between each point of the first plurality of points of the color image 112 and the corresponding point of the second plurality of points of the generated back-projected image 304A. The computation of the optical flow map is further described in detail, for example, in FIG. 5.

At 308, a 3D correspondence determination operation may be executed. In the 3D correspondence determination operation, the processor 204 may be configured to determine a plurality of 3D correspondence points 308A for a corresponding plurality of vertices of the initial 3D shape model 116. The plurality of 3D correspondence points 308A may be determined based on the computed optical flow map 306A and the depth image 114 of the face of the user 110. Specifically, the plurality of 3D correspondence points 308A may be estimated based on a 2D coordinate of each point of a plurality of points on the back-projected image 304A. The plurality of 3D correspondence points 308A may be further estimated based on a 2D vector saved for each corresponding point on the optical flow map 306A and a depth value of a corresponding vertex on the initial 3D shape model 116. The determination of the plurality of 3D correspondence points 308A is further described in detail, for example, in FIG. 6.

At 310, a final 3D shape model estimation operation may be executed. In the final 3D shape model generation operation, the processor 204 may be configured to estimate a final 3D shape model 310A based on the initial 3D shape model 116 and the determined plurality of 3D correspondence points 308A for the corresponding plurality of vertices of the initial 3D shape model 314. Specifically, in one or more embodiments, the processor 204 may be configured to offset positions of at least a first set of vertices of the corresponding plurality of vertices of the initial 3D shape model 116 based on the determined plurality of 3D correspondence points 308A. The estimated final 3D shape model 310A may correspond to a shape-refined 3D model of the face of the user 110. The estimation of the final 3D shape model 310A is further described in detail, for example, in FIG. 6.

Figure 4:
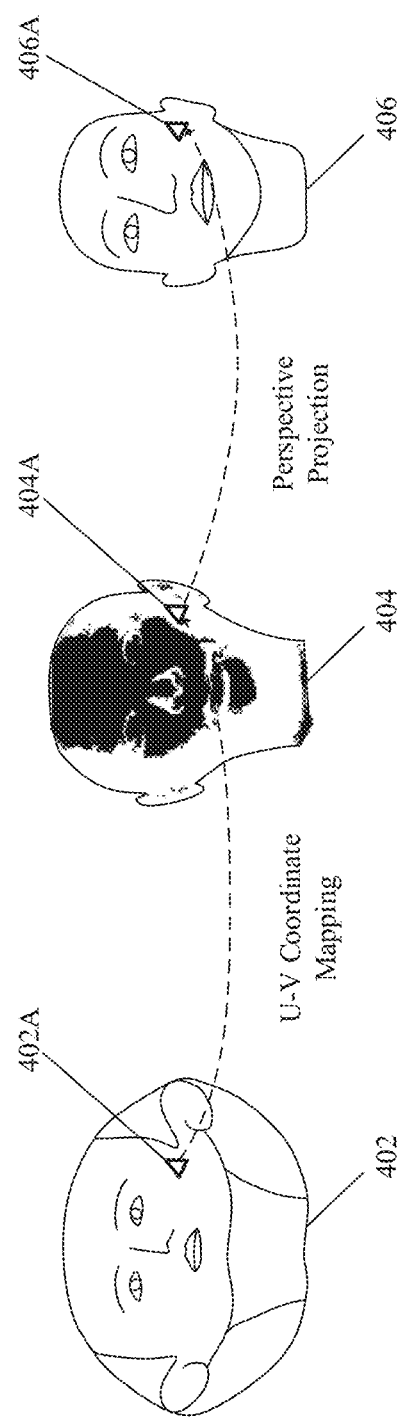
FIG. 4 illustrates exemplary scenario for generation of a back-projected image, in accordance with an embodiment of the disclosure.

FIG. 4 illustrates exemplary scenario for generation of a back-projected image, in accordance with an embodiment of the disclosure. FIG. 4 is explained in conjunction with elements from FIGS. 1, 2, and 3. With reference to FIG. 4, there is shown a texture map 402, an initial 3D shape model 404, a back-projected image 406, a first triangle 402A, a second triangle 404A, and a third triangle 406A. The initial 3D shape model 404 and the texture map 402 may correspond to the texture map 118 and the initial 3D shape model 116, respectively.

The processor 204 may be configured to determine a first plurality of triangles on the texture map 402 and a second plurality of triangles on the initial 3D shape model 404. The first plurality of triangles on the texture map 402 may include the first triangle 402A and the second plurality of triangles on the initial 3D shape model 404 may include the second triangle 404A.

The processor 204 may be further configured to map each triangle of the first plurality of triangles on the texture map 402 to a corresponding triangle of the second plurality of triangles on the initial 3D shape model 404. Specifically, U-V coordinates of each triangle of the first plurality of triangles on the texture map 402 may be mapped to the corresponding triangle of the second plurality of triangles on the initial 3D shape model 404. "U" and "V" of the U-V coordinate may herein represent 2D coordinates of the texture values in the texture map 402. Shown as an example, the first triangle 402A on the texture map 402 may be mapped to the second triangle 404A on the initial 3D shape model 404.

The processor 204 may be further configured to texture the initial 3D shape model 404 based on the texture map 402 of the face of the user 110. The initial 3D shape model 404 may be textured based on the texture information from the texture map 402. As an example, the texture of the first triangle 402A on the texture map 402 may be applied as texture for the second triangle 404A on the initial 3D shape model 404.

The processor 204 may be further configured to project the textured initial 3D shape model 404 onto a 2D image plane. The projection of the textured initial 3D shape model 404 may be a perspective projection of each triangle of the first plurality of triangles onto the 2D image plane. In certain instances, the perspective projection may be performed based on one or more projection parameters, such as, but not limited to, a focal length of the image sensor 104A, a center of projection, and a distance between the image sensor 104A and the user 110.

The processor 204 may be further configured to generate the back-projected image 406 for the face portion of the user 110 based on the projection of the textured initial 3D shape model 404 onto the 2D image plane. The back-projected image 406 may be a 2D image which represents the face of the user 110 and may include the texture information of the face of the user 110 (as also represented in the texture map 402). As an example, the texture transferred to the second triangle 404A from the first triangle 402A may be further transferred to the third triangle 406A in the 2D image plane. Similarly, texture from all the triangles on the textured initial 3D shape model 404 may be transferred to remaining corresponding triangles on the 2D image plane. The texture from all the triangles on the 2D image plane may collectively be referred to as the back-projected image 406 of the face portion of the user 110. As the back-projected image 406 is generated based on the texture information from the texture map 402, a lighting influence on the face of the user 110 may not be considered when directly transferring texture to the back-projected image 406 from texture map 402. Initially, the texture map 402 may not include the lighting influence due to the albedo information saved on the texture map 402. The real lighting conditions may need to be estimated and added back to the back projected image 406. Such a lighting influence may be due to lighting conditions, for example, natural or artificial light sources.

Figure 5:
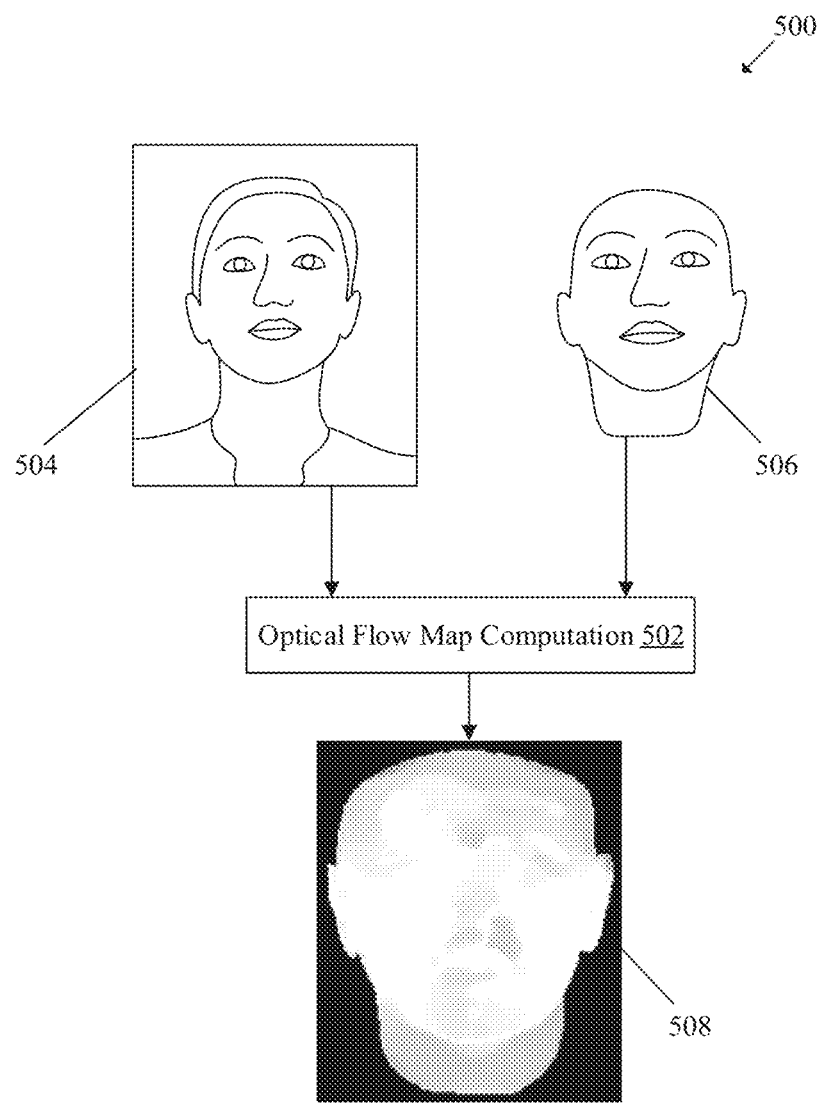
FIG. 5 illustrates exemplary operations for computation of an optical flow map, in accordance with an embodiment of the disclosure.

FIG. 5 illustrates exemplary operations for computation of an optical flow map, in accordance with an embodiment of the disclosure. FIG. 5 is explained in conjunction with elements from FIGS. 1, 2, 3, 4, and 5. With reference to FIG. 5, there is shown a processing pipeline 500. The processing pipeline 500 includes one or more operations for optical flow map computation 502. There is further shown a color image 504, a back-projected image 506, and an optical flow map 508. The color image 504 and the back-projected image 506 may correspond to the color image 112 and the back-projected image 406, respectively.

The processor 204 may be configured to compute the optical flow map 508 between the back-projected image 506 and the color image 504 of the face of the user 110. The optical flow map 508 may be computed based on an offset between each point of a first plurality of points of the color image 504 and a corresponding point of a second plurality of points of the back-projected image 506. The offset may be a difference between position of a point of the color image 504 and a corresponding point of the back-projected image 506. Each point of the optical flow map 508 may represent the offset between position of a point of the first plurality of points of the color image 504 and a corresponding point of the second plurality of points of the back-projected image 506. For example, for each point (x, y) of the back-projected image 506, the optical flow "$I_o$" may be represented by a 2D vector (u, v) and the corresponding point on of the color image 504 may be represented by (x+u, y+v), which may be also considered as a correspondence for a vertex mapped to (x, y).

Figure 6:
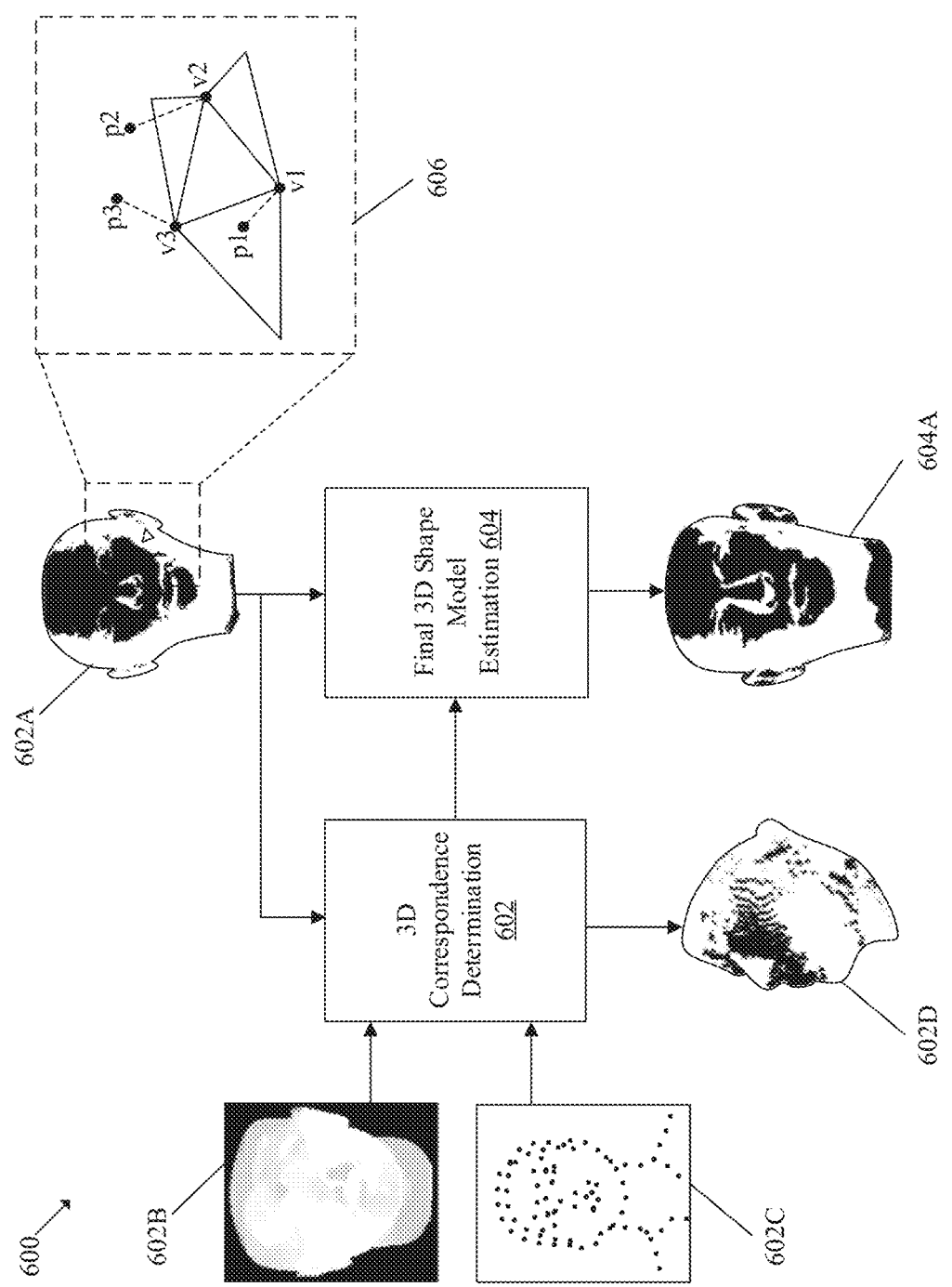
FIG. 6 illustrates exemplary operations for estimation of a final 3D shape model, in accordance with an embodiment of the disclosure.

FIG. 6 illustrates exemplary operations for estimation of a final 3D shape model, in accordance with an embodiment of the disclosure. FIG. 6 is described in conjunction with elements from FIGS. 1, 2, 3, 4, and 5. With reference to FIG. 6, there is shown an initial 3D shape model 602A, an optical flow map 602B, a depth image 602C, a plurality of 3D correspondence points 602D, and a final 3D shape model 604A. The initial 3D shape model 602A, the optical flow map 602B, and the depth image 602C may correspond to the initial 3D shape model 116, the computed optical flow map 508, and the depth image 114, respectively. There is further shown a processing pipeline 600 for estimation of the final 3D shape model 604A.

At 602, a 3D correspondence determination operation may be executed. In the 3D correspondence determination operation, the processor 204 may be configured to determine the plurality of 3D correspondence points 602D for a corresponding plurality of vertices of the initial 3D shape model 602A based on the optical flow map 602B and the depth image 602C of the face of the user 110.

Exemplary operations for the determination of the plurality of 3D correspondence points 602D are presented herein. The processor 204 may be configured to determine a first depth coordinate from a set of depth coordinates that correspond to a set of vertices of the initial 3D shape model 602A. The set of depth coordinates corresponding to the set of vertices may be Z-coordinate values of the corresponding set of vertices. Here, the set of vertices of the initial 3D shape model 602A may be mapped to a single 2D position or a point on the back-projected image 406.

The determined first depth coordinate may correspond to a value that is maximum among the set of depth coordinates of the set of vertices. Additionally, from the set of vertices of the initial 3D shape model 602A, a vertex which has a depth coordinate equal to the determined first depth coordinate may belong to an observable surface of the initial 3D shape model 602A. For example, there may be a set of vertices that may be mapped to a single 2D position on the back-projected image 406, and a depth coordinate value of each of the plurality of vertices may be different. In such cases, a vertex that is associated with a depth coordinate having a maximum value may belong to the observable surface of the initial 3D shape model 602A. The observable surface may correspond to a surface of the initial 3D shape model 602A which is visible to a viewer, such as the user 110.

The processor 204 may be further configured to estimate a vertex index for each observed vertex of the plurality of vertices of the initial 3D shape model 602A based on the determined first depth coordinate. Specifically, the estimated vertex index of each observed vertex may correspond to the first depth coordinate which is maximum among a set of depth coordinates of the set of vertices of the initial 3D shape model 602A. Here, the set of vertices may have different depth coordinates but may correspond to a single 2D point on the back-projected image 406.

The processor 204 may be further configured to assign the vertex index estimated for each observed vertex of the plurality of vertices of the initial 3D shape model 602A as a vertex index for a corresponding point of the second plurality of points on the generated back-projected image 406. Similarly, there may be a plurality of vertex indices which may be assigned to the second plurality of points and may correspond to an index map for the back-projected image 406. For example, when projecting the initial 3D shape model 602A onto the 2D image plane, a plurality of vertex indices (or the index map) may be obtained by recording the index of the observed vertex at each 2D position of the back-projected image 406. The judgment of the observation may be made based on comparison of the z coordinate of each vertex mapped to the same 2D position. The observed vertex should have larger z coordinate than the other vertices mapped to the same 2D position.

The processor 204 may be further configured to determine the plurality of 3D correspondence points 602D for the corresponding plurality of vertices of the initial 3D shape model 602A based on the assigned vertex index for each corresponding point of the second plurality of points on the generated back-projected image 406. Also, each 3D correspondence point of the plurality of 3D correspondence points 602D may be determined further based on an optical flow for a corresponding point in the optical flow map 602B. As an example, for a point represented by (x, y) in the back-projected image 406, an optical flow may be represented by (u, v). In case a vertex index for an observed vertex on the point (x, y) may be estimated as "i" and if a point "p" may be estimated as a 3D point from a depth value at (x+u, y+v) of the depth image 602C, then the point "p" may be assigned as a 3D correspondence point for the vertex index "i". Similarly, the processor 204 may be configured to estimate a 3D correspondence point for each vertex of the initial 3D shape model 602A.

At 604, a final 3D shape model estimation operation may be executed. In the final 3D shape model estimation operation, the processor 204 may be configured to estimate the final 3D shape model 604A based on the initial 3D shape model 602A and the determined plurality of 3D correspondence points 602D for the corresponding plurality of vertices of the initial 3D shape model 602A. The final 3D shape model 604A may correspond to the final 3D shape model 310A of FIG. 3. The final 3D shape model 604A may be to a shape-refined 3D model of the face of the user 110. The details of the estimation of the final 3D shape model 604A is described herein.

The processor 204 may be configured to offset positions of at least a first set of vertices of the corresponding plurality of vertices of the initial 3D shape model 602A based on the determined plurality of 3D correspondence points 602D. Alternatively stated, the processor 204 may be further configured to displace a position of at least the first set of vertices of the initial 3D shape model 602A to a corresponding set of 3D correspondence points of the determined plurality of 3D correspondence points 602D. For example, as shown in an enlarged view 606 of the initial 3D shape model 602A, the processor 204 may be configured to displace a vertex "v1" to a 3D correspondence point "p1", a vertex "v2" to a 3D correspondence point "p2", and a vertex "v3" to a 3D correspondence point "p3".

The processor 204 may be further configured to estimate the final 3D shape model 604A based on the offset of at least the first set of vertices of the corresponding plurality of vertices of the initial 3D shape model 602A. In one or more embodiments, the processor 204 may be further configured to estimate the final 3D shape model 604A further based on optimization (or minimization) of an objective function. The objective function may include a data term and a smoothing term. For example, the objective function may be given by equation (1), as follows:

$$\min_{\Delta v_i, \ldots, \Delta v_n} \sum_{i=1}^{n} (c_i^P(\Delta v_i) + w_1 c_i^W(\Delta v_i)) + w_2 C^L(\Delta v_i) \quad (1)$$

where
$(c_i^P(\Delta v_i) + w_1 c_i^W(\Delta v_i))$ represents the data term;
$C^L$ represents the smoothening term;
$(\Delta v_i)$ represents an objective displacement for a vertex "i" of the initial 3D shape model 602A;
$w_1$ represents the weight for the data term for landmarks.

$w_2$ represents the weight for the smoothing term. The weights ($w_1$ and $w_2$) decide the importance of the data term and the smoothing term in the objective function.

The processor 204 may be further configured to compute the data term by application of a Euclidean norm on a difference between the corresponding plurality of vertices of the initial 3D shape model 602A and the determined plurality of 3D correspondence points 602D. The data term may be computed, for example, by using equation (2), as follows:

$$c_i^{P,W}(\Delta v_i) = \|\Delta v_i - (p_i - v_i)\|_2^2 \quad (2)$$

where,
$(\Delta v_i)$ represents an objective displacement for a vertex "i" of the initial 3D shape model 602A;
$v_i$ represents a vertex of the initial 3D shape model 602A;
$p_i$ represents a 3D correspondence point corresponding to the vertex $v_i$;
$c_i^P(\Delta v_i)$ represents a Euclidean norm for each observed vertex of the initial 3D shape model 602A; and
$c_i^W(\Delta v_i)$ represents a Euclidean norm for landmarks on the initial 3D shape model 602A. For example, the landmarks on the initial 3D shape model 602A may correspond to a plurality of landmark points of the face of the user 110, such as eyes, nose, lips, etc.

The processor 204 may be further configured to compute the smoothing term by application of Laplacian smoothing on a mean shape of the initial 3D shape model 602A. Here, the smoothing term may be a Laplacian smoothing term and may be computed, for example, by using equation (3), as follows:

$$C^L = L(m) \Delta v \quad (3)$$

where,
$L(m)$ represents weights assigned for each vertex of the initial 3D shape model 602A based on its smoothness among its neighborhood. For example, for a vertex "$v_i$" of the initial 3D shape model 602A, "$v_j$" may be incident one-ring neighbors of the vertex "$v_i$" and thus, $L(m)$ for the vertex "$v_i$" may be calculated, for example, by using equation (4) and (5), as follows:

$$L_{ii} = -\frac{1}{w_i} \sum_j w_{ij} \quad (4)$$

$$L_{ij} = \frac{w_{ij}}{w_i} \quad (5)$$

where,
$w_i$ represents weight of the vertex "$v_i$"; and
$w_{ij}$ represents a weight of the vertex "$v_i$" based on its smoothness among its neighborhood vertex "$v_j$". The processor 204 may be configured to estimate "$w_i$" and "$w_{ij}$" for the vertex "$v_i$" based on a function of discrete Laplace-Beltrami at the vertex "$v_i$". The function of discrete Laplace-Beltrami at the vertex "$v_i$" may be represented, for example, by equation (6), as follows:

$$\Delta v_i = w_i \sum_{v_j \in N_1(v_i)} w_{ij}(v_i - v_j) \quad (6)$$

where,
$v_j \in N_1(v_i)$ represents incident one-ring neighbors of the vertex "$v_i$".

The processor 204 may be further configured to calculate "$w_i$" and "$w_{ij}$" for the vertex "$v_i$", for example, by using equation (7) and (8) as follows:

$$w_i = \frac{1}{A_i} \quad (7)$$

$$w_{ij} = \frac{1}{2}(\cot\alpha_{ij} + \cot\beta_{ij}) \quad (8)$$

where,
$\alpha_{ij}$ and $\beta_{ij}$ represents two angles opposite to an edge between the vertex "$v_i$" and vertex "$v_j$";
$A_i$ represents a Voronoi area of the vertex "$v_i$"; and
"$v_i$" represents an area of the surface region built by connecting incident edges' midpoints with triangle circumcenter. The final 3D shape model 604A may represent an accurate shape of a plurality of features, such as the eyes, nose, or ears on the face of the user 110 and may be a photorealistic shape model of the face portion of the user 110.

Although FIGS. 3, 4, 5 and 6 are explained using an example of the face portion as the object portion; however, the disclosure may not be so limiting and in some embodiments, the object portion can be a portion of any other animate or inanimate object and the description of FIGS. 3, 4, 5 and 6 can also be construed for any other animate or inanimate object, without a deviation from scope of the disclosure.

Figure 7:
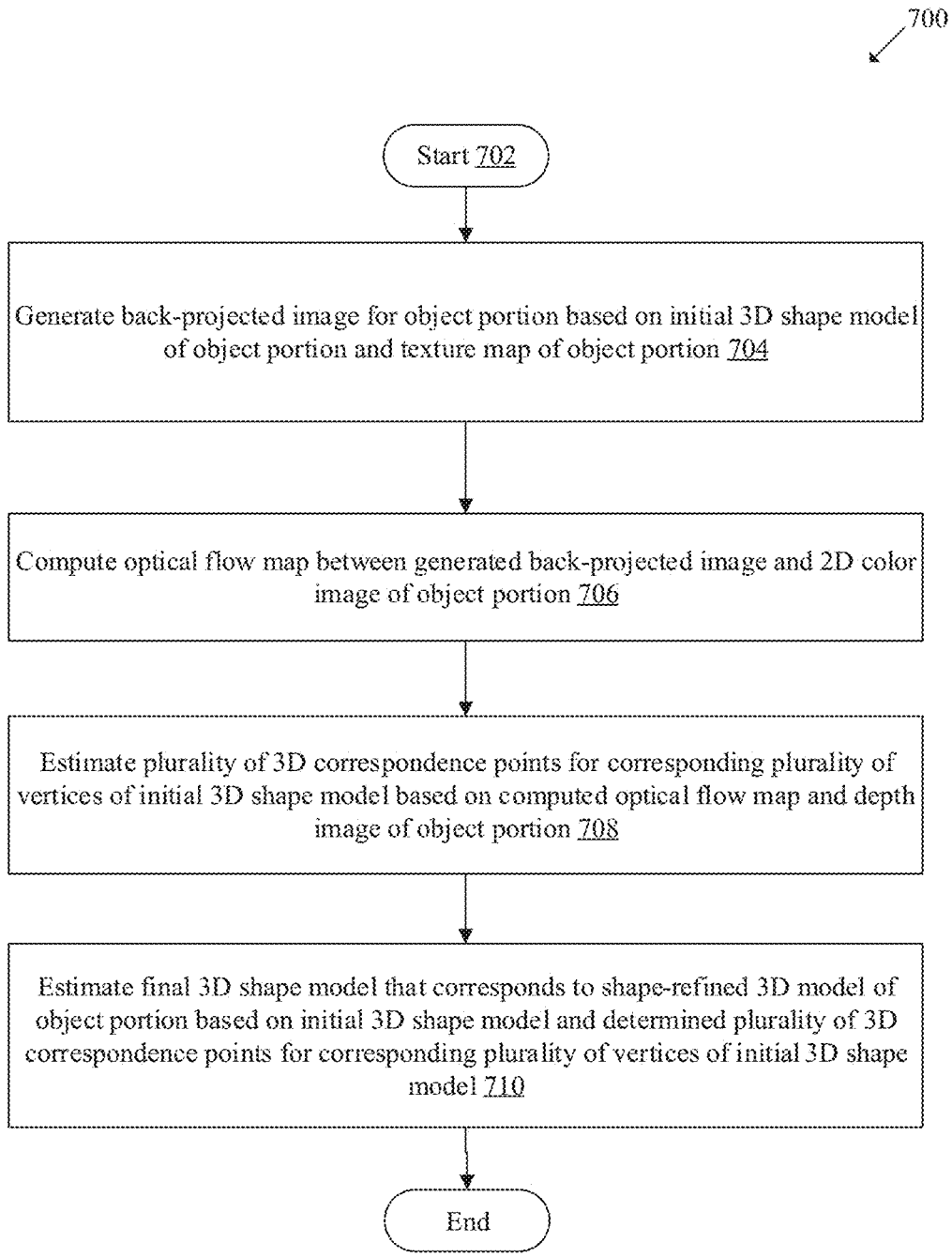
FIG. 7 is a flowchart that illustrates an exemplary method for shape refinement of a 3D shape model, in accordance with an embodiment of the disclosure.

FIG. 7 is a flowchart that illustrates an exemplary method for shape refinement of a 3D shape model, in accordance with an embodiment of the disclosure. FIG. 7 is described in conjunction with elements from FIGS. 1, 2, 3, 4, 5, and 6. With reference to FIG. 7, there is shown a flowchart 700. The exemplary method of the flowchart 700 may be executed by any computing device, such as by the electronic apparatus 102. The operations may start at 702 and proceed to 704.

At 704, a back-projected image for an object portion may be generated based on the initial 3D shape model of the object portion and the texture map of the object portion. The processor 204 may be configured to generate the back-projected image of the object portion based on the initial 3D shape model and the texture map.

The processor 204 may be further configured to transform and map each triangle of a plurality of triangles on the texture map to a corresponding triangle on a 2D image plane by using the initial 3D shape model. The processor 204 may be further configured to apply texture information from the texture map on the initial 3D shape model. The texture information may be applied on the initial 3D shape model based on U-V coordinate mapping of the texture map on the initial 3D shape model. The processor 204 may be further configured to back project the initial 3D shape model with the applied texture information from the texture map onto the 2D image plane.

At 706, an optical flow map may be computed between the generated back-projected image and a color image of the object portion. The processor 204 may be further configured to compute the optical flow map between the generated back-projected image and the color image of the object portion. The processor 204 may be further configured to compute the optical flow map based on an offset between each point of the first plurality of points of the color image and the corresponding point of the second plurality of points of the generated back-projected image.

At 708, a plurality of 3D correspondence points may be determined for the corresponding plurality of vertices of the initial 3D shape model based on the computed optical flow map and the depth image of the object portion. The processor 204 may be configured to determine the plurality of 3D correspondence points based on the computed optical flow map and the depth image of the object portion. The plurality of 3D correspondence points may be points corresponding to the plurality of vertices of the initial 3D shape model in the 3D space and may represent intricate details of the features of the object portion.

At 710, a final 3D shape model that corresponds to a shape-refined 3D model of the object portion may be estimated based on the initial 3D shape model and the determined plurality of 3D correspondence points for the corresponding plurality of vertices of the initial 3D shape model. The processor 204 may be configured to estimate the final 3D shape model of the object portion based on the initial 3D shape model and the determined plurality of 3D correspondence points for the corresponding plurality of vertices of the initial 3D shape model. The processor 204 may be further configured to offset positions of at least a first set of vertices of the corresponding plurality of vertices of the initial 3D shape model based on the determined plurality of 3D correspondence points. The control may pass to end.

Various embodiments of the disclosure may provide a non-transitory, computer-readable medium and/or storage medium, and/or a non-transitory machine readable medium and/or storage medium stored thereon, instructions executable by a machine and/or a computer, such as an electronic apparatus, for shape refinement of a 3D shape model. The at least one code section may cause the machine and/or computer to perform operations that include generation of a back-projected image for an object portion based on an initial three-dimensional (3D) shape model of the object portion and a texture map of the object portion. The operations further include computation of an optical flow map between the generated back-projected image and a two-dimensional (2D) color image of the object portion. The operations further include determination of a plurality of 3D correspondence points for a corresponding plurality of vertices of the initial 3D shape model, based on the computed optical flow map and a depth image of the object portion. The operations further include estimation of a final 3D shape model that corresponds to a shape-refined 3D model of the object portion based on the initial 3D shape model and the determined plurality of 3D correspondence points for the corresponding plurality of vertices of the initial 3D shape model.

Exemplary aspects of the disclosure may include the electronic apparatus 102 that includes the circuitry 202. The circuitry 202 may be configured to generate the back-projected image for an object portion based on the initial three-dimensional (3D) shape model of the object portion and the texture map of the object portion. The circuitry 202 may be further configured to compute the optical flow map between the generated back-projected image and a two-dimensional (2D) color image of the object portion. The circuitry 202 may be further configured to determine the plurality of 3D correspondence points for a corresponding plurality of vertices of the initial 3D shape model, based on the computed optical flow map and the depth image of the object portion. The circuitry 202 may be further configured to estimate the final 3D shape model of the object portion based on the initial 3D shape model and the determined plurality of 3D correspondence points for the corresponding plurality of vertices of the initial 3D shape model. The final 3D shape model may correspond to a shape-refined 3D model of the object portion.

In accordance with an embodiment, the electronic apparatus 102 may further include the scanning device 104. The scanning device may be configured to capture a plurality of color images of the object portion and depth information corresponding to the plurality of color images. The plurality of color images and the depth information may include the 2D color image and the depth image of the object portion, respectively. The circuitry 202 may be further configured to generate the initial 3D shape model for the object portion based on the captured plurality of color images and the depth information. In accordance with an embodiment, the object portion may corresponds to a face portion of a human object, such as the user 110.

In accordance with an embodiment, the circuitry 202 may be further configured to generate an initial texture map for the object portion based on the initial 3D shape model of the object portion, the 2D color image, and corresponding depth information of the object portion. The circuitry 202 may be further configured to generate a model-fitted texture map for the object portion by texture model fitting of a reference texture model on a plurality of effective points on the generated initial texture map. The reference texture model may be a Principal Component Analysis (PCA) model of a plurality of texture maps of a corresponding plurality of reference object portions different from the object portion of an object of interest. The plurality of effective points may correspond to points that belong to the object portion observed in the 2D color image.

The circuitry 202 may be further configured to determine a first plurality of triangles on the model-fitted texture map. The circuitry 202 may be further configured to map each triangle of the first plurality of triangles on the model-fitted texture map to a corresponding triangle of a second plurality of triangles on the initial 3D shape model. The circuitry 202 may be further configured to generate the back-projected image for the object portion based on a perspective projection of the second plurality of triangles on a 2D image plane. The second plurality of triangles may be textured based on the texture map of the object portion. The back-projected image may be generated such that a lighting influence on the object portion is included in each point of the back-projected image.

In accordance with an embodiment, the circuitry 202 may be further configured to texture the initial 3D shape model based on the texture map of the object portion. The circuitry 202 may be further configured to project the textured initial 3D shape model onto a 2D image plane. The circuitry 202 may be further configured to generate the back-projected image for the object portion based on the projection of the textured initial 3D shape model onto the 2D image plane. The circuitry 202 may be further configured to compute the optical flow map based on an offset between each point of a first plurality of points of the 2D color image and a corresponding point of a second plurality of points of the generated back-projected image of the object portion.

In accordance with an embodiment, the circuitry 202 may be further configured to determine a first depth coordinate from a set of depth coordinates that corresponds to a set of vertices of the initial 3D shape model. The set of vertices may be mapped to a 2D position on the back-projected image. The determined first depth coordinate may correspond to a value that is maximum among the set of depth coordinates. A vertex, from the set of vertices, having the determined first depth coordinate belongs to an observable surface of the initial 3D shape model.

In accordance with an embodiment, the circuitry may be further configured to estimate a vertex index for each observed vertex of the corresponding plurality of vertices of the initial 3D shape model based on the determined first depth coordinate. The set of vertices may have different depth coordinates but correspond to a single 2D point on the back-projected image. Further, the circuitry may be configured to assign the vertex index estimated for each observed vertex of the plurality of vertices of the initial 3D shape model as a vertex index for a corresponding point of a second plurality of points on the back-projected image. The circuitry may be further configured to determine the plurality of 3D correspondence points for the corresponding plurality of vertices of the initial 3D shape model based on the assigned vertex index for each corresponding point of the second plurality of points on the back-projected image and an optical flow for a corresponding point in the optical flow map.

In accordance with an embodiment, the circuitry 202 may be further configured to offset positions of at least a first set of vertices of the corresponding plurality of vertices of the initial 3D shape model based on the determined plurality of 3D correspondence points. The circuitry 202 may be further configured to estimate the final 3D shape model based on the offset of at least the first set of vertices of the corresponding plurality of vertices of the initial 3D shape model. The circuitry 202 may be further configured to compute a data term by application of a Euclidean norm on a difference between the corresponding plurality of vertices of the initial 3D shape model and the determined plurality of 3D correspondence points. The circuitry 202 may be further configured to compute a smoothing term by application of Laplacian smoothing on a mean shape of the initial 3D shape model. The circuitry 202 may be further configured to estimate the final 3D shape model further based on an objective function that comprises the computed data term and the computed smoothing term.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic apparatus, comprising:
   circuitry configured to:
   generate a back-projected image for an object portion based on an initial three-dimensional (3D) shape model of the object portion and a texture map of the object portion;
   compute an optical flow map between the generated back-projected image and a two-dimensional (2D) color image of the object portion;
   determine a plurality of 3D correspondence points for a corresponding plurality of vertices of the initial 3D shape model, based on the computed optical flow map and a depth image of the object portion; and
   estimate a final 3D shape model that corresponds to a shape-refined 3D model of the object portion based on the initial 3D shape model and the determined plurality of 3D correspondence points for the corresponding plurality of vertices of the initial 3D shape model.

2. The electronic apparatus according to claim 1, further comprising a scanning device configured to capture a plurality of color images of the object portion and depth information corresponding to the plurality of color images,
   wherein the plurality of color images and the depth information comprises the 2D color image and the depth image of the object portion respectively.

3. The electronic apparatus according to claim 2, wherein the circuitry is further configured to generate the initial 3D shape model for the object portion based on the captured plurality of color images and the depth information.

4. The electronic apparatus according to claim 1, wherein the object portion corresponds to a face portion of a human object.

5. The electronic apparatus according to claim 1, wherein the circuitry is further configured to:
   generate an initial texture map for the object portion based on the initial 3D shape model of the object portion, the 2D color image, and corresponding depth information of the object portion; and
   generate a model-fitted texture map for the object portion by texture model fitting of a reference facial texture model on a plurality of effective points on the generated initial texture map,
      wherein the reference facial texture model is a Principal Component Analysis (PCA) model of a plurality of facial texture maps of a corresponding plurality of reference object portions different from the object portion, and
      wherein the plurality of effective points corresponds to points that belong to the object portion observed in the 2D color image.

6. The electronic apparatus according to claim 5, wherein the circuitry is further configured to:
   determine a first plurality of triangles on the model-fitted texture map; and
   map each triangle of the first plurality of triangles on the model-fitted texture map to a corresponding triangle of a second plurality of triangles on the initial 3D shape model.

7. The electronic apparatus according to claim 6, wherein the circuitry is further configured to generate the back-projected image for the object portion based on a perspective projection of the second plurality of triangles on a 2D image plane, wherein the second plurality of triangles is textured based on the texture map of the object portion.

8. The electronic apparatus according to claim 1, wherein the back-projected image is generated such that a lighting influence on the object portion is included in each point of the back-projected image.

9. The electronic apparatus according to claim 1, wherein the circuitry is further configured to:
   texture the initial 3D shape model based on the texture map of the object portion;
   project the textured initial 3D shape model onto a 2D image plane; and
   generate the back-projected image for the object portion based on the projection of the textured initial 3D shape model onto the 2D image plane.

10. The electronic apparatus according to claim 1, wherein the circuitry is further configured to compute the optical flow map based on an offset between each point of a first plurality of points of the 2D color image and a corresponding point of a second plurality of points of the generated back-projected image of the object portion.

11. The electronic apparatus according to claim 1, wherein the circuitry is further configured to determine a first depth coordinate from a set of depth coordinates that corresponds to a set of vertices of the initial 3D shape model,
   wherein the set of vertices are mapped to a 2D position on the generated back-projected image.

12. The electronic apparatus according to claim 11,
   wherein the determined first depth coordinate corresponds to a value that is maximum among the set of depth coordinates, and
   wherein, from the set of vertices, a vertex having the determined first depth coordinate belongs to an observable surface of the initial 3D shape model.

13. The electronic apparatus according to claim 12, wherein the circuitry is further configured to estimate a vertex index for each observed vertex of the corresponding plurality of vertices of the initial 3D shape model based on the determined first depth coordinate,
   wherein the set of vertices have different depth coordinates but correspond to a single 2D point on the back-projected image.

14. The electronic apparatus according to claim 13, wherein the circuitry is further configured to assign the vertex index estimated for each observed vertex of the plurality of vertices of the initial 3D shape model as a vertex index for a corresponding point of a second plurality of points on the back-projected image.

15. The electronic apparatus according to claim 14, wherein the circuitry is further configured to determine the plurality of 3D correspondence points for the corresponding plurality of vertices of the initial 3D shape model based on the assigned vertex index for each corresponding point of the second plurality of points on the back-projected image and an optical flow for a corresponding point in the optical flow map.

16. The electronic apparatus according to claim 1, wherein the circuitry is further configured to offset positions of at least a first set of vertices of the corresponding plurality of vertices of the initial 3D shape model based on the determined plurality of 3D correspondence points.

17. The electronic apparatus according to claim 16, wherein the circuitry is further configured to estimate the final 3D shape model based on the offset of at least the first set of vertices of the corresponding plurality of vertices of the initial 3D shape model.

18. The electronic apparatus according to claim 16, wherein the circuitry is further configured to:
 compute a data term by application of a Euclidean norm on a difference between the corresponding plurality of vertices of the initial 3D shape model and the determined plurality of 3D correspondence points; and
 compute a smoothing term by application of Laplacian smoothing on a mean shape of the initial 3D shape model.

19. The electronic apparatus according to claim 18, wherein the circuitry is configured to estimate the final 3D shape model further based on an objective function that comprises the computed data term and the computed smoothing term.

20. A method, comprising:
 in an electronic apparatus:
  generating a back-projected image for an object portion based on an initial three-dimensional (3D) shape model of the object portion and a texture map of the object portion;
  computing an optical flow map between the generated back-projected image and a two-dimensional (2D) color image of the object portion;
  determining a plurality of 3D correspondence points for a corresponding plurality of vertices of the initial 3D shape model, based on the computed optical flow map and a depth image of the object portion; and
  estimating a final 3D shape model that corresponds to a shape-refined 3D model of the object portion based on the initial 3D shape model and the determined plurality of 3D correspondence points for the corresponding plurality of vertices of the initial 3D shape model.

* * * * *